(12) United States Patent
Aksay et al.

(10) Patent No.: US 9,546,092 B2
(45) Date of Patent: Jan. 17, 2017

(54) FUNCTIONALIZED GRAPHENE SHEETS HAVING HIGH CARBON TO OXYGEN RATIOS

(75) Inventors: Ilhan A. Aksay, Princeton, NJ (US); David L. Milius, Princeton, NJ (US); Sibel Korkut, Princeton, NJ (US); Robert K. Prud'Homme, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 548 days.

(21) Appl. No.: 12/866,306

(22) PCT Filed: Feb. 3, 2009

(86) PCT No.: PCT/US2009/032947
§ 371 (c)(1),
(2), (4) Date: Feb. 7, 2011

(87) PCT Pub. No.: WO2009/134492
PCT Pub. Date: Nov. 5, 2009

(65) Prior Publication Data
US 2011/0114897 A1    May 19, 2011

Related U.S. Application Data

(60) Provisional application No. 61/026,264, filed on Feb. 5, 2008.

(51) Int. Cl.
*H01B 1/04* (2006.01)
*C01B 31/04* (2006.01)
*B82Y 30/00* (2011.01)
*B82Y 40/00* (2011.01)

(52) U.S. Cl.
CPC ............ *C01B 31/0476* (2013.01); *B82Y 30/00* (2013.01); *B82Y 40/00* (2013.01); *C01B 31/0484* (2013.01); *C01B 2204/22* (2013.01); *C01B 2204/30* (2013.01); *C01B 2204/32* (2013.01)

(58) Field of Classification Search
CPC ............ H01B 1/24; H01B 1/04; C01B 31/00; C01B 31/043; C01B 31/0423; C01B 31/0469; B82Y 30/00; B82Y 40/00
USPC .............. 252/500–511; 423/448, 415.1, 461; 977/734, 755
See application file for complete search history.

(56) References Cited

U.S. PATENT DOCUMENTS

| 7,658,901 | B2 | 2/2010 | Prud'Homme et al. |
| 7,659,350 | B2 | 2/2010 | Prud'Homme et al. |
| 7,745,528 | B2 | 6/2010 | Prud'Homme et al. |
| 7,771,824 | B2 | 8/2010 | Herrera-Alonso et al. |
| 8,449,959 | B2 | 5/2013 | Aksay et al. |
| 2007/0092432 | A1 | 4/2007 | Prud'Homme et al. |
| 2007/0131915 | A1 | 6/2007 | Stankovich et al. |
| 2008/0302561 | A1 | 12/2008 | Prud'Homme et al. |
| 2008/0312368 | A1 | 12/2008 | Prud'Homme et al. |
| 2009/0048386 | A1* | 2/2009 | Plee ............................ 524/496 |
| 2009/0053433 | A1 | 2/2009 | Prud'Homme et al. |
| 2009/0053437 | A1 | 2/2009 | Prud'Homme et al. |
| 2009/0054272 | A1 | 2/2009 | Prud'Homme et al. |
| 2009/0054578 | A1 | 2/2009 | Prud'Homme et al. |
| 2009/0054581 | A1 | 2/2009 | Prud'Homme et al. |
| 2009/0123752 | A1 | 5/2009 | Prud'Homme et al. |
| 2009/0123843 | A1 | 5/2009 | Aksay et al. |
| 2009/0127514 | A1 | 5/2009 | Korkut et al. |
| 2009/0233057 | A1 | 9/2009 | Aksay et al. |
| 2010/0096595 | A1 | 4/2010 | Prud'Homme et al. |
| 2012/0145234 | A1 | 6/2012 | Roy-Mayhew et al. |
| 2012/0237749 | A1 | 9/2012 | Aksay et al. |
| 2012/0244333 | A1 | 9/2012 | Aksay et al. |
| 2013/0302588 | A1 | 11/2013 | Aksay et al. |
| 2015/0155404 | A1 | 6/2015 | Roy-Mayhew et al. |
| 2015/0173188 | A1 | 6/2015 | Prud'Homme et al. |

FOREIGN PATENT DOCUMENTS

| CN | 1793451 A | 6/2006 |
| JP | 2007-269545 A | 10/2007 |
| WO | WO 2007/047084 A2 | 4/2007 |

OTHER PUBLICATIONS

Kiang et al. ("Chemical reduction of graphene oxide: a synthetic chemistry viewpoint." Chem Soc Rev, 43, pp. 291-312, 2014).*
Schniepp, H. C. et al., "Functionalized Single Graphene Sheets Derived From Splitting Graphite Oxide", The Journal of Physical Chemistry B, vol. 110, No. 17, pp. 8535-8539 (Apr. 11, 2006).
Stankovich, S. et al., "Synthesis of Graphene-Based nanosheets Via Chemical Rduction of Exfoliated Graphite Oxide", Carbon, vol. 45, pp. 1558-1565 (Mar. 6, 2007).
U.S. Appl. No. 12/945,043, filed Nov. 12, 2010, Pan, et al.
U.S. Appl. No. 13/077,070, filed Mar. 31, 2011, Prud'Homme, et al.
Chinese Office Action issued Aug. 22, 2012, in China Patent Application No. 200980109434.2 (with English translation).
U.S. Appl. No. 13/603,818, filed Sep. 5, 2012, Crain, et al.
U.S. Appl. No. 13/510,678, filed Jun. 14, 2012, Roy-Mayhew, et al.
U.S. Appl. No. 12/791,190, filed Jun. 1, 2010, Prud'Homme, et al.
U.S. Appl. No. 12/866,089, filed Aug. 4, 2010, Crain, et al.
U.S. Appl. No. 12/866,079, filed Aug. 4, 2010, Crain, et al.
Office Action issued Jul. 22, 2013 in Chinese Patent Application No. 200980109434.2 with English language translation.
Office Action issued Sep. 3, 2013, in Japanese Patent Application No. 2010-545949 with English translation.
U.S. Appl. No. 14/379,145, filed Aug. 15, 2014, Aksay, et al.
U.S. Appl. No. 14/017,869, filed Sep. 4, 2013, Aksay, et al.
U.S. Appl. No. 14/189,501, filed Feb. 25, 2014, Crain, et al.
Extended European Search Report issued Aug. 5, 2014 in Patent Application No. 09739294.8.

(Continued)

*Primary Examiner* — Tri V Nguyen
(74) *Attorney, Agent, or Firm* — Oblon, McClelland, Maier & Neustadt, L.L.P.

(57) ABSTRACT

Functionalized graphene sheets having a carbon to oxygen molar ratio of at least about 23:1 and method of preparing the same.

14 Claims, 1 Drawing Sheet

(56) References Cited

OTHER PUBLICATIONS

Supplementary European Search Report issued Aug. 22, 2014 in Patent Application No. 09739294.8.
Sandi G. Miller et al., "Interfacial Strength and Physical Properties of Functionalized Graphene—Epoxy Nanocomposites", Global Advances in Materials and Process Engineering: Sampe Fall Technical Conference, XP-002657665, Nov. 6, 2006, 6 pages.
Athanasios B. Bourlinos et al., "Graphite Oxide: Chemical Reduction to Graphite and Surface Modification with Primary Aliphatic Amines and Amino Acids", Langmuir, vol. 19, No. 15, XP-055131524, Jun. 25, 2003, pp. 6050-6055.
U.S. Appl. No. 14/736,838, filed Jun. 11, 2015, Aksay, et al.
U.S. Appl. No. 14/689,638, filed Apr. 17, 2015, Crain, et al.
U.S. Appl. No. 14/739,184, filed Jun. 15, 2015, Pope, et al.
U.S. Appl. No. 14/751,418, filed Jun. 26, 2015, Crain, et al.
Office Action issued Oct. 23, 2016, in European Patent Application No. 0973924.8, filed Feb. 3, 2009.

* cited by examiner

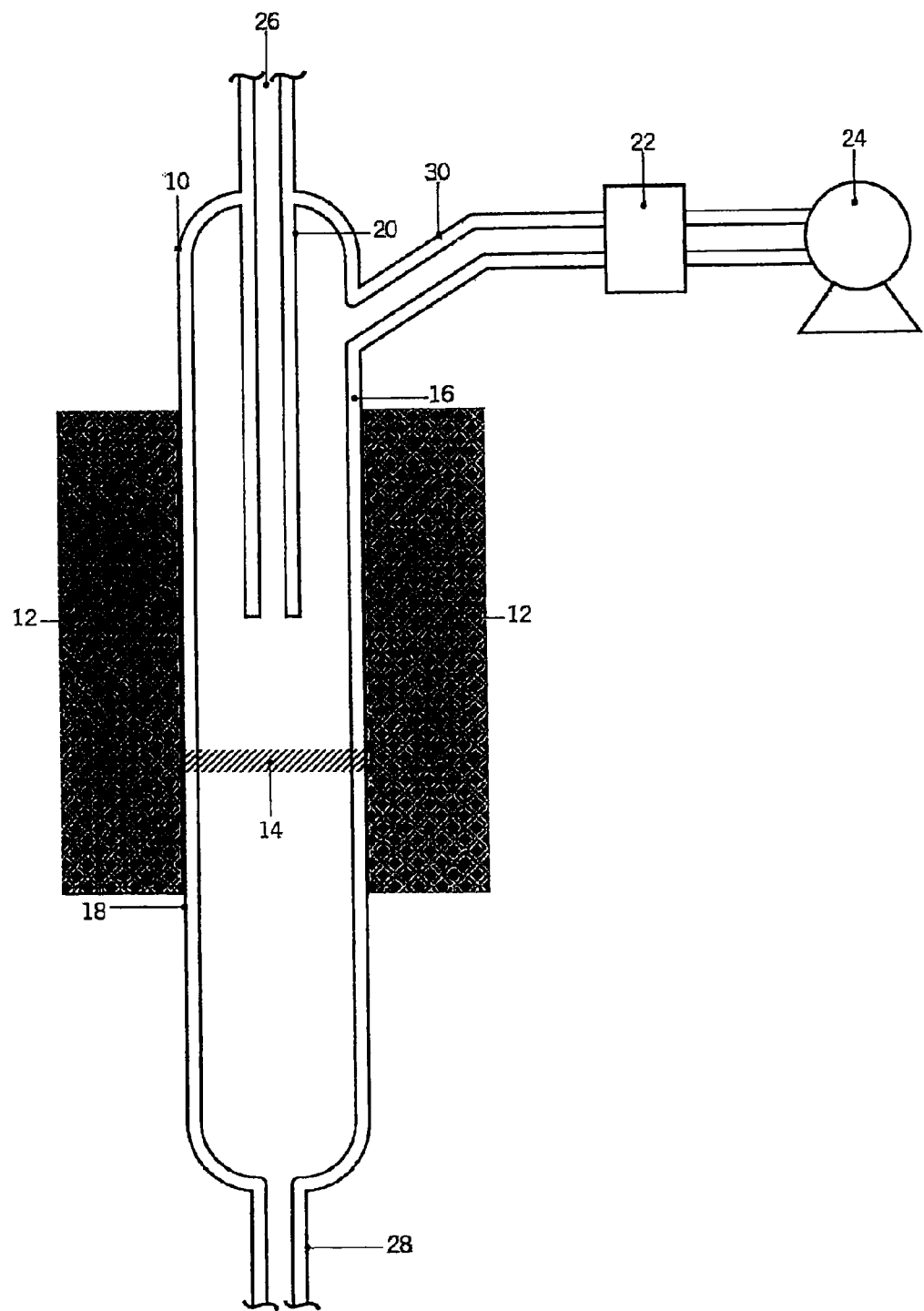

FUNCTIONALIZED GRAPHENE SHEETS HAVING HIGH CARBON TO OXYGEN RATIOS

This invention was made with Government support under Grant No. CMS-0609049, awarded by the National Science Foundation, and under Grant No. NCC1-02037, awarded by NASA. The Government has certain rights in the invention.

FIELD OF THE INVENTION

The present invention relates to functionalized graphene sheets having low oxygen content and methods for their preparation.

BACKGROUND

Thermally exfoliated graphite oxide (TEGO) (also known as functionalized graphene sheets) has been disclosed in US patent application publication US 2007/0092432; Schniepp, H. C. et al. *J. Phys. Chem. B.* 2006, 110, 8535-8539; McAllister, M. J. et al. *Chem. Materials* 2007 19, 4396-4404; and Kudin, N. K. et al. *Nano Letters* 2008, 8, 36-41, which are hereby incorporated by reference herein. Graphite oxide is formed by the treatment of graphite with oxidizing agents and intercalants or other oxidizing means and has a high oxygen content. During the thermal exfoliation of graphite oxide, oxygen functionalized sites on the graphite oxide decompose to evolve oxygen-containing gases that are liberated from the system, resulting in a thermally exfoliated graphite oxide that typically has a lower oxygen content on a molar basis than does the starting graphite oxide. The forgoing references disclose the formation of graphite oxide having carbon to oxygen molar ratios of between about 1.5:1 and 20:1.

However, in many applications, it would be desirable to obtain functionalized graphene sheets (FGS) having a higher carbon to oxygen ratio. For example, the amount of oxygen functional groups can affect the reactivity of the FGS with a polymer matrix when they are used as reinforcement fillers and/or affect nature of an adsorbed layer at the FGS interface; the presence of oxygen can be deleterious in certain applications; and the presence of oxygen-containing functional groups on the FGS can disrupt the pi-conjugated system, which can decrease the electrical conductivity of the material.

SUMMARY OF THE INVENTION

Disclosed and claimed here are functionalized graphene sheets having a carbon to oxygen molar ratio of at least about 23 to 1. Further disclosed and claimed herein are polymer composites or resins comprising functionalized graphene sheets having a carbon to oxygen molar ratio of at least about 23 to 1 and a method for making said functionalized graphene sheets.

BRIEF DESCRIPTION OF THE DRAWINGS

FIG. 1 shows a cross-sectional schematic diagram of an apparatus suitable for use in preparing the functionalized graphene sheets of the present invention.

DESCRIPTION

As used herein, the term "carbon to oxygen ratio" refers to molar ratios of carbon to oxygen in the FGS. Carbon to oxygen ratio is determined by elemental analysis and the resulting weight ratios are converted to molar ratios.

The FGS (referred to herein as "high carbon to oxygen ratio functionalized graphene sheets", or "FGS-HCO") of the present invention have a carbon to oxygen ratio of at least about 23:1, or preferably at least about 25:1. In some embodiments of the invention, the carbon to oxygen ratio is at least about 28:1 or least about 35:1, or at least about 50:1, or at least about 75:1, or at least about 100:1, or at least about 200:1, or at least about 300:1, or at least about 400:1, or at least 500:1, or at least about 750:1, or at least about 1000:1, or at least about 1500:1, or at least about 2000:1.

The FGS-HCO of the present invention is formed by heating graphite oxide and/or FGS having lower carbon to oxygen ratios (for example, a ratio of not more than 20:1) at a temperature of at least about 750° C. under reducing atmospheric conditions (e.g., in systems purged with inert gases or hydrogen) for a time sufficient to react these starting materials to yield FGS-HCO. The heating process is referred to herein as "reduction." The temperature used is preferably at least about 850° C., or more preferably at least about 950° C., or yet more preferably at least about 1000° C. The temperature used is preferably between about 750 about and 3000° C., or more preferably between about 850 and 2500° C., or yet more preferably between about 950 and about 2500° C. The time of heating is preferably at least about 2 minutes, or more preferably at least about 5 minutes. In some embodiments, the heating time will be at least about 15 minutes, or about 30 minutes, or about 45 minutes, or about 60 minutes, or about 90 minutes, or about 120 minutes, or about 150 minutes. During the course of heating, the temperature may vary within these ranges.

The heating may be done under a variety of conditions, including in an inert atmosphere (such as argon or nitrogen) or a reducing atmosphere, such as hydrogen (including hydrogen diluted in an inert gas such as argon or nitrogen), or under vacuum. The heating may be done in any appropriate vessel, such as a fused silica or a mineral or ceramic vessel or a metal vessel. The materials being heated (including any starting materials (i.e., graphite oxide and/or FGS-HCO) and any products or intermediates) may be contained in an essentially constant location in single batch reaction vessel, or may be transported through one or more vessels during the reaction in a continuous or batch reaction. Heating may be done using any suitable means, including the use of furnaces and infrared heaters. An example of an apparatus that can be used in the present invention is given in FIG. 1, which is described in more detail in the Examples section. This or a similar apparatus can be used in many embodiments of the present invention, and need not have the same dimensions as those described in the examples. It also need not have an identical structure or form.

Graphite oxide may be produced by any method known in the art, such as by a process that involves oxidation of graphite using one or more chemical oxidizing agents and, optionally, intercalating agents such as sulfuric acid. Examples of oxidizing agents include nitric acid, sodium and potassium nitrates, perchlorates, hydrogen peroxide, sodium and potassium permanganates, phosphorus pentoxide, bisulfites, and the like. Preferred oxidants include $KClO_4$; $HNO_3$ and $KClO_3$; $KMnO_4$ and/or $NaMnO_4$; $KMnO_4$ and $NaNO_3$; $K_2S_2O_5$ and $P_2O_5$ and $KMnO_4$; $KMnO_4$ and $HNO_3$; and $HNO_3$. A preferred intercalation agent includes sulfuric acid. Graphite may also be treated with intercalating agents and electrochemically oxidized.

In a preferred method, graphite is oxidized to graphite oxide, which is then thermally exfoliated to form high surface area FGS that is in the form of thermally exfoliated graphite oxide, as described in US 2007/0092432. The thusly formed FGS may display little or no signature corresponding to graphite or graphite oxide in its X-ray or electron diffraction patterns. Exfoliation, including the exfoliation of graphite oxide is preferably carried out at temperatures of at least 500° C. or more, preferably at temperatures of from 500 to 3000° C.

The FGS-HCO of the present invention preferably has a surface area of from about 250 to about 2630 m$^2$/g. In some embodiments of the present invention, the FGS-HCO primarily, almost completely, or completely comprises fully exfoliated single sheets of graphite (often referred to as "graphene"), while in other embodiments, they may comprise partially exfoliated graphite sheets, in which two or more graphene layers have not been exfoliated from each other. The FGS-HCO may comprise mixtures of fully and partially exfoliated graphite sheets.

The surface area is more preferably from about 300 to about 2630 m$^2$/g, or even more preferably from about 350 to about 2400 m$^2$/g, or still more preferably of from about 400 to about 2400 m$^2$/g, yet more preferably of from about 500 to about 2400 m$^2$/g, or even more preferably of from about 800 to about 2400 m$^2$/g. In another preferred embodiment, the surface area is about 300 to about 1100 m$^2$/g. A single graphite sheet has a maximum calculated surface area of 2630 m$^2$/g. The surface area includes all values and subvalues therebetween, especially including 400, 500, 600, 700, 800, 900, 100, 110, 1200, 1300, 1400, 1500, 1600, 1700, 1800, 1900, 2000, 2100, 2200, 2300, 2400, 2500, and 2630 m$^2$/g.

Surface area can be measured using either the nitrogen adsorption/BET method or, preferably, a methylene blue (MB) dye method.

The dye method is carried out as follows: A known amount of FGS is added to a flask. At least 1.5 g of MB are then added to the flask per gram of FGS. Ethanol is added to the flask and the mixture is ultrasonicated for about fifteen minutes. The ethanol is then evaporated and a known quantity of water is added to the flask to re-dissolve the free MB. The undissolved material is allowed to settle, preferably by centrifuging the sample. The concentration of MB in solution is determined using a UV-vis spectrophotometer by measuring the absorption at $\lambda_{max}$=298 nm relative to that of standard concentrations.

The difference between the amount of MB that was initially added and the amount present in solution as determined by UV-vis spectrophotometry is assumed to be the amount of MB that has been adsorbed onto the surface of the FGS. The surface area of the FGS is then calculated using a value of 2.54 m$^2$ of surface covered per one mg of MB adsorbed.

The FGS-HCO preferably has a bulk density of from about 40 to about 0.1 kg/m$^3$. The bulk density includes all values and subvalues therebetween, especially including 0.5, 1, 5, 10, 15, 20, 25, 30, and 35 kg/m$^3$.

The FGS-HCO of the present invention may be used in a variety of applications. The FGS-HCO may be used alone (in the form of sheets, films, molded articles, etc.) or in combination (such as blends) with other components or in solids, suspensions, etc. For example, they may be used in conjunction with a binder to form coatings (including inks and paints) or films or with one or more polymeric materials to form composites or resins. The combinations may be in the form of coatings, printed materials, films, sheets, molded and extruded articles (including those formed from methods such as injection molding, blow molding, compression molding, ram extrusion, and the like) The FGS-HCO may be incorporated into the composites or resins using any suitable means including, but are not limited to, blending with the polymer (such as by melt compounding), mixing with thermosetting monomers prior to curing, or mixing with monomers that are then polymerized. The composites or resins can optionally contain additional components.

Polymeric materials can be thermosets, thermoplastics, non-melt processable polymers, and the like. Examples of polymers include acrylonitrile/butadiene/styrene (ABS), polycarbonates (PC), polyamides (including polyterephthalamides, polyesters (including poly(butylene terephthalate) (PBT), poly(ethylene terephthalate) (PET), and the like), poly(phenylene oxide) (PPO), polysulphone (PSU), polyetherketone (PEK), polyetheretherketone (PEEK), polyimides, polyoxymethylene (POM), poly(lactic acid), poly(acrylonitrile), styrene/acrylonitrile polymers (SAN), polyetherimides, polystyrene (including high impact polystyrene), liquid crystalline polymers (LCPs), aramides (such as Kevlar® and Nomex®), polytetrafluoroethylene (PTFE), fluorinated ethylene propylene polymers (FEP), poly(vinyl fluoride), poly(vinylidene fluoride), poly(vinylidene chloride), poly(vinyl chloride), polyolefins (such as polyethylene and polypropylene and olefin copolymers), poly(vinyl acetates), poly(methyl methacrylate) and other acrylate polymers, polysiloxanes (including polydimethylenesiloxane), elastomers (including, but not limited to, polyurethanes, copolyetheresters, rubbers (including butyl rubbers), styrene/butadiene copolymers, polyisoprene, natural rubber, and polysiloxanes, epoxy polymers, polyureas, alkyds, cellulosic polymers, polyethers (such as poly(ethylene oxides and poly(propylene oxides)), and the like.

In one embodiment of the present invention, when the FGS-HCO is used in blends with other materials, the composite material is electrically conductive and preferably has a conductivity of at least about 10$^{-6}$ S/m. In an embodiment of the invention, when it is desirable that the composite materials be semiconductors, they preferably have a conductivity of about 10$^{-6}$ S/m to about 10$^5$ S/m, or more preferably of about 10$^{-5}$ S/m to about 10$^5$ S/m. In other embodiments of the invention, the coatings have conductivities of at least about 100 S/m, or at least about 1000 S/m, or at least about 10$^4$ S/m, or at least about 10$^5$ S/m, or at least about 10$^6$ S/m. In the case of materials where the FGS-HCO is blended with a binder or polymer (including when the blend is in a liquid form), the conductivities may be determined after the blends have been dried, cured, cross-linked or otherwise treated.

In some embodiments, the functionalized graphene sheets of the present invention have improved electrical conductivity both in pure form, and/or in blends or composites with other materials, than similar materials having lower carbon to oxygen ratios, including ratios of under 20:1.

EXAMPLES

Preparation of Graphite Oxide

Graphite oxide is prepared from graphite by treatment with sulfuric acid, nitric acid, and potassium chlorate according to the methods disclosed in Staudenmaier, L. *Ber. Stsch. Chem. Ges.* 1898, 31, 1481 and Schniepp, H. C. et al. *J. Phys. Chem. B.* 2006, 110, 8535-8539 (and its Supporting Information), and McAllister, M. J. et al. *Chem. Materials* 2007 19, 4396-4404.

Composite Conductivity Measurements

A poly(ethylene oxide) (PEO) solution is prepared by mixing a sufficient amount of PEO having a molecular weight of 4,000,000 with a 1:1 volume/volume mixture of ethanol and de-ionized water to produce a mixture containing 40 mg of PEO per mL of total solvent. After stirring overnight, a homogeneous PEO stock solution is obtained. In the case of the Examples and Comparative Examples in Tables 1 and 2, the PEO was obtained from Union Carbide Corp., while in the case of the Examples and Comparative Examples in Tables 3, it was obtained from Aldrich Chemicals.

The reduced samples from Tables 1-3 are weighed and a sufficient amount of concentrated aqueous Pluronic® F127 (an ethylene oxide/propylene oxide copolymer surfactant supplied by BASF) solution (typically 2 mg/mL) is added to the FGS to yield a mixture having a 1:1 weight ratio of reduced material and Pluronic F127. Sufficient de-ionized water is added to produce a suspension containing 1 mg FGS per 1 ml of water. The resulting suspension is sonicated for 5 minutes with a duty cycle of 20 percent in an ice bath. 1 mL of the reduced material suspension is then added to 3 mL of the PEO stock solution and the mixture is stirred for 3-5 minutes until homogeneous.

Two copper plates (22 mm×22 mm) are wrapped with Teflon tape, leaving 1 mm of copper uncovered at the lower ends. The plates are then firmly attached to the shorter of the side walls of a Teflon® cell (23 mm×46 mm inner base area, 32 mm height) with screws. The mixture is poured into the Teflon® cell and kept at 50° C. on a hot plate until all of the solvent is evaporated to form films that are attached to the copper plates. The resulting film contains 6.52 weight percent FGS, 6.52 weight percent Pluronic® F127, and 86.96 weight percent PEO, based on the total weight of FGS, Pluronic® F127, and PEO. The films are peeled off the cell by lifting the plates and are cut to rectangular shapes to exclude inhomogeneous (porous or thinner) regions. Final film lengths, widths, and thicknesses are in the ranges of about 10-32 mm, about 7-22 mm, and about 6-39 μm, respectively.

Copper tapes are attached parallel to each other on two ends of the film such that they cover the entire width of the film. A power supply (Tektronix PS 252G Programmable Power Supply, Tektronix Inc., Beaverton, Oreg.) and a multimeter (Fluke 27 Multimeter, Fluke Corp., Everett, Wash.) are attached in serial with the film via the copper tapes. A potential difference (5-20 V) is applied and current is monitored through the multimeter. An electrometer (Keithley 6514, Keithley Instruments Inc., Cleveland, Ohio) with two electrodes is used to measure the potential difference across two points along the direction of the current. The potential difference measured on the film and current is used to find the resistance using Ohm's law, i.e. $R=V/I$; where R, V, and I are the resistance, voltage, and current, respectively. Resistivity ($\sigma$) is found by $\sigma=RA/L$, where A and L are the cross section of the film through which current flows and the length over which the potential difference is measured. Conductivity ($\kappa$) is found by $\kappa=1/\sigma$. Two measurements are taken on different points of the film and the linear average is reported as the conductivity.

In each case except for Examples 5 and 11, two measurements are made and the results are averaged and given in Tables 1-3. In the cases of Examples 3 and 9, a single measurement is made and the results are reported in the tables.

Other Analytical Methods

C:O ratios are molar ratios determined from the results of elemental analysis. Surface area measurements are done using the BET method with the nitrogen adsorption technique.

Reduction Method A

Examples 1-15 and Comparative Examples 1-3

Up to two steps are used in this method. In step I, the FGS is placed in an alumina boat and inserted into a 25 mm ID, 1.3 m long silica tube that was sealed at one end. The other end of the silica tube was closed using a rubber stopper. A gas inlet and thermocouple were inserted through the rubber stopper and the sample is flushed with a nitrogen/hydrogen gas mixture having a 95:5 molar ratio for 10 minutes, and then the tube is inserted into a tube furnace preheated to the temperatures indicated in Tables 1-3 and held for the period of time indicated in the tables.

In step II, the material (either FGS or the product of step I) is placed in an atmosphere of 100 mTorr of argon gas in a graphite furnace (Astro-1000, supplied by Thermal Technologies) for the times and temperatures indicated in Tables 2 and 3 (step II is not performed in the case of the experiments in Table 1). The material is heated to the desired temperature at a rate of 20° C./min and held at that temperature for the times indicated in the tables.

TABLE 1

| | Step I time (min) | Step I temperature (° C.) | Composite conductivity (S/m) | C:O ratio | Surface area (m²/g) |
|---|---|---|---|---|---|
| Comp. Ex. 1 | 0 | 1000 | $1.67 \times 10^1$ | 12.7 | 581 |
| Ex. 1 | 4 | 1000 | $3.54 \times 10^2$ | 301 | 600 |
| Ex. 2 | 30 | 1000 | $2.35 \times 10^2$ | 71.8 | 636 |

TABLE 2

| | Step I time (min) | Step I temperature (° C.) | Step II time (min) | Step II temperature (° C.) | Composite conductivity (S/m) | C:O ratio | Surface area (m²/g) |
|---|---|---|---|---|---|---|---|
| Ex. 3 | — | — | 2 | 2000 | $2.88 \times 10^2$ | 549 | 211 |
| Ex. 4 | 10 | 1000 | 240 | 2250 | $6.78 \times 10^2$ | 374 | 148 |
| Ex. 5 | — | — | 240 | 2250 | $5.93 \times 10^2$ | 253 | 147 |
| Ex. 6 | — | — | 240 | 2350 | $3.23 \times 10^2$ | 548 | 101 |

TABLE 3

| | Step I time (min) | Step I temperature (° C.) | Step II time (min) | Step II temperature (° C.) | Composite conductivity (S/m) | C:O ratio | Surface area (m²/g) |
|---|---|---|---|---|---|---|---|
| Ex. 7 | — | — | 240 | 2250 | $7.51 \times 10^3$ | 254 | 147 |
| Ex. 8 | 10 | 1000 | 240 | 2250 | $1.31 \times 10^4$ | 374 | 148 |
| Ex. 9 | — | — | 2 | 2000 | $5.13 \times 10^3$ | 549 | 211 |
| Ex. 10 | — | — | 240 | 2350 | $3.83 \times 10^3$ | 548 | 101 |
| Ex. 11 | — | — | 2 | 1500 | $4.02 \times 10^3$ | 663 | 442 |
| Ex. 12 | — | — | 2 | 1100 | $1.99 \times 10^3$ | 146 | 603 |

Reduction Method B

Examples 13-25 and Comparative Examples 2-8

Graphite oxide (GO) is exfoliated (in experiments referred to as the "Exfol." process in Table 4) using the apparatus shown in cross-sectional schematic form in FIG. 1. A silica tube 10 is encased in a vertical infrared furnace 12 held at about 1040° C. The tube has a outer diameter of about 35 mm and extends for about 50 cm from above the furnace to the point 16 where it enters the furnace. About 50 additional cm of tube 10 are enclosed in the furnace. Tube 10 extends for more than about 45 cm from the point 18 at which it exits the furnace. Tube 10 contains a glass frit 14 located about 15 cm above point 18 and a ca. 10 mm o.d. open silica inner tube 20 that extends through the middle of tube 10 to about 8.5 cm above the frit. The top of tube 20 passes through the wall of tube 10 where it forms inlet 26. The bottom opening 28 of tube 10 is connected to a gas inlet, gas outlet, or vacuum port (not shown) and the top outlet 30 is connected to a filter 22 that is in turn connected to a pump 24. Openings 26, 28, and 30 are connected to valves (not shown) that can be used to isolate them from environment outside the apparatus.

The graphite oxide is continuously carried by an argon stream through inlet 26 into tube 10 where it reacts, and the resulting exfoliated product exits through outlet 30 and is collected by filter 22. Opening 28 can also be used to introduce argon into or to apply a vacuum to the system.

The reduction experiments (referred to as the "Red." process in Table 4) are run in two ways. Previously made FGS can then be passed through the tube again in a continuous manner similar to that used for the exfoliation, but with 4 mole percent hydrogen in argon as a carrier gas. Alternatively, graphite oxide or FGS are introduced into tube 10 via inlet 26 and held for a period of time (given under the heading "Holding time" in Table 4) without being allowed to exit through outlet 30 while tube 10 is continuously flushed with a 4 mole percent hydrogen in argon gas mixture. The hydrogen/argon mixture is introduced through inlet 26, and in some cases, though opening 28. The rates of gas flow through each opening for each example or comparative example are given in Table 4. In the case of Example 19, a vacuum was applied to the system through opening 28 and the hydrogen argon mixture was introduced through openings 26 and 30 with the flow rates indicated in Table 4. The carbon to oxygen ratios of the resulting products are determined by elemental analysis.

The GO starting material used comes from several batches, which are indicated in Table 4. In the case of Examples 20-22, the starting material is FGS prepared in Comparative Example 5; in the case of Example 24, the starting material is FGS prepared in Comparative Example 7; and in the case of Example 25, the starting material is FGS prepared in Comparative Example 8.

TABLE 4

| | Process | Starting material | Carrier gas | Holding time (min) | Product C:O ratio | Gas inlet rate through inlet 26 (mL/min) | Gas inlet rate through opening 28 (mL/min) |
|---|---|---|---|---|---|---|---|
| Comp. Ex. 2 | Exfol. | GO (batch A) | Ar | — | 18 | — | — |
| Comp. Ex. 3 | Red. | GO (batch A) | 4% $H_2$ | — | 17 | 360 | 3550 |
| Comp. Ex. 4 | Red. | GO (batch A) | 4% $H_2$ | — | 21 | 565 | 3550 |
| Ex. 13 | Red. | GO (batch A) | 4% $H_2$ | — | 27 | 750 | 3550 |
| Ex. 14 | Red. | GO (batch A) | 4% $H_2$ | — | 30 | 125 | 1780 |
| Ex. 15 | Red. | GO (batch A) | 4% $H_2$ | — | 26 | 750 | 3550 |
| Ex. 16 | Red. | GO (batch A) | 4% $H_2$ | 3 | 25 | 360 | |
| Comp. Ex. 5 | Exfol. | GO (batch B) | Ar | — | 23 | — | 235 (through outlet 30); vacuum at opening 28 |
| Ex. 17 | Red. | GO (batch B) | 4% $H_2$ | 3 | 33 | 450 | 1780 |
| Ex. 18 | Red. | GO (batch B) | 4% $H_2$ | 5 | 29 | 450 | 1780 |
| Ex. 19 | Red. | GO (batch B) | 4% $H_2$ | 3 | 25 | 450 | 2670 |
| Ex. 20 | Red. | FGS (product of Comp. Ex. 5) | 4% $H_2$ | 120 | 81 | 360 | 0 |
| Ex. 21 | Red. | FGS (product of Comp. Ex. 5) | 4% $H_2$ | 15 | 58 | 360 | 0 |
| Ex. 22 | Red. | FGS (product of Comp. Ex. 5) | 4% $H_2$ | 15 | 27 | 450 | 1785 |
| Comp. Ex. 6 | Exfol. | GO (batch C) | Ar | — | 19 | — | — |
| Ex. 23 | Red. | GO (batch C) | 4% $H_2$ | — | 26 | 565 | 3550 |
| Comp. Ex. 7 | Exfol. | GO (batch D) | Ar | — | 16 | — | — |
| Ex. 24 | Red. | FGS (product of Comp. Ex. 7) | 4% $H_2$ | 30 | 58 | 360 | 0 |
| Comp. Ex. 8 | Exfol. | GO (batch E) | Ar | — | 18 | — | — |
| Ex. 25 | Red. | FGS (product of Comp. Ex. 8) | 4% $H_2$ | 30 | 24 | 360 | 0 |

The invention claimed is:

1. Functionalized graphene sheets having a carbon to oxygen molar ratio of at least about 23:1 and comprising fully exfoliated single sheets of graphene, and wherein the functionalized graphene sheets are dry.

2. The functionalized graphene sheets of claim 1, wherein the carbon to oxygen ratio is at least about 28:1.

3. The functionalized graphene sheets of claim 1, wherein the carbon to oxygen ratio is at least about 50:1.

4. The functionalized graphene sheets of claim 1, wherein the carbon to oxygen ratio is at least about 75:1.

5. The functionalized graphene sheets of claim 1 further comprising functionalized graphene sheets having a surface area of between about 350 and about 2400 $m^2/g$.

6. The functionalized graphene sheets of claim further comprising functionalized graphene sheets having a surface area of between about 400 and about 2400 m²/g.

7. The functionalized graphene sheets of claim 1 further comprising functionalized graphene sheets having a surface area of between about 500 and about 2400 m²/g.

8. The functionalized graphene sheets of claim 1 further comprising functionalized graphene sheets having a surface area of between about 800 and about 2400 m²/g.

9. A method for making functionalized graphene sheets as claimed in claim 1, comprising heating graphite oxide and/or functionalized graphene sheets having a carbon to oxygen ratio of less than about 23:1 at a temperature of at least about 750° C. for a time sufficient to generate functionalized graphene sheets having a carbon to oxygen molar ratio of at least about 23:1 wherein the functionalized graphene sheets comprise fully exfoliated single sheets of graphene and wherein the functionalized graphene sheets are dry.

10. The method of claim 9, wherein the temperature is at least about 850° C. and the heating time is at least about 2 minutes.

11. The method of claim 9, wherein the temperature is at least about 950° C. and the heating time is at least about 2 minutes.

12. The method of claim 9, wherein the heating time is at least 15 minutes.

13. The method of claim 9, wherein the heating is conducted in an inert atmosphere.

14. The method of claim 9, wherein the heating is conducted in a reducing atmosphere.

* * * * *